United States Patent Office 3,798,216
Patented Mar. 19, 1974

3,798,216
9-FLUORO - 11β,21 - DIHYDROXY-16α,17-(2-PROPENYLIDENEDIOXY)-PREGNA - 1,4-DIENE-3,20-DIONE AND DERIVATIVES THEREOF
Jacques Robert Boissier, Paris, and Roger Ratouis, Saint Cloud, France, assignors to Societe Anonyme dite: Societe Industrielle pour la Fabrication des Antibiotique (S.I.F.A.), Puteaux, France
No Drawing. Continuation of abandoned application Ser. No. 14,196, Feb. 25, 1970. This application May 8, 1972, Ser. No. 251,513
Int. Cl. C07c 173/00
U.S. Cl. 260—239.55 D
4 Claims

ABSTRACT OF THE DISCLOSURE

Pregnan derivatives of the general formula:

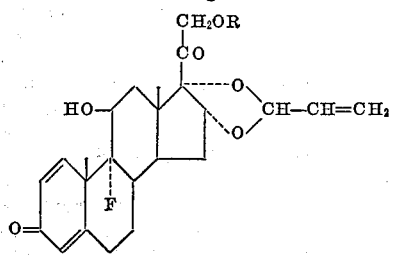

(1)

wherein R: hydrogen atom or acyl radical of a saturated aliphatic carboxylic acid, containing from 2 to 6 carbon atoms and eventually substituted by a free carboxylic group (—COOH), or by a salified carboxylic group (—COOA: A being an alkaline metal or the ammonium), said carboxylic group being separated from the —CO— group of the acyl radical by at least 2 carbon atoms.

These products are very useful drugs more particularly as antiinflammatory drugs.

The products are prepared by action of 9-fluoro-11β-16α,17,21 - tetrahydroxy-pregna-1,4-diene-3,20-dione with acrolein in the presence of an acid catalyst, and isolation of the resulting 9-fluoro-11β,21-dihydroxy-16α,17-(2-propenylidenedioxy)-pregna-1,4-diene-3,20-dione, or esterification of said product with the anhydrid of an acid of formula R'—OH [R': acyl radical of a saturated aliphatic carboxylic acid containing from 2 to 6 carbon atoms and eventually substituted by a free carboxylic group (—COOH)] and eventual salification by an alkaline agent.

This is a continuation of application Ser. No. 14,196, filed Feb. 25, 1970, now abandoned.

The present invention relates to new pregnan derivatives of the general formula:

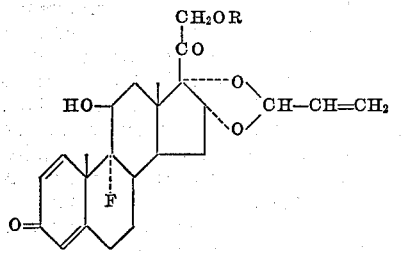

(1)

wherein R is a hydrogen atom or the acyl radical of a saturated aliphatic, linear or branched carboxylic acid, containing from 2 to 6 carbon atoms and eventually substituted by a free carboxylic group (—COOH), or by a salified carboxylic group (—COOA: A being an alkaline metal or the ammonium), said carboxylic group being separated from the —CO— group of the acyl radical by at least 2 carbon atoms.

It is known that the terms acyl radical mean the univalent radical obtained by removing a hydroxyl group from the carboxylic radical of the corresponding carboxylic acid.

The invention relates also to the process for the preparation of the derivatives of the Formula 1, process which comprises acetalizing the 9-fluoro-11β,16α,17,21-tetrahydroxypregna-1,4-diene-3,20-dione by acrolein in the presence of an acid catalyst, and isolating the resulting 9-fluoro - 11β,21-dihydroxy-16α,17-(2-propenylidenedioxy)-pregna - 1,4-diene-3,20-dione, or esterifying said product with the anhydrid of an acid of formula R'—OH, in which R' represents the acyl radical of a saturated aliphatic, linear or branched carboxylic acid containing from 2 to 6 carbon atoms and eventually substituted by a free carboxylic group (—COOH), said carboxylic group being separated from the —CO— group of the acyl radical by at least 2 carbon atoms, and eventually, when the R' radical carries a free carboxylic group, salifying the obtained product by an alkaline agent.

Besides, the invention relates to the use of the derivatives of Formula 1 as drugs and more particularly as antiinflammatory drugs and to the pharmaceutical compositions comprising said derivatives as active substances.

The process for the preparation of the derivatives of Formula 1 is preferably performed as follows:

(1) The acid catalyst is an inorganic acid such as hydrochloric or perchloric acid. The reaction is carried out in an organic solvent inert towards the products in reaction, such as benzene, toluene, xylene, dioxan, tetrahydrofuran, with stirring, at room temperature and for 3 to 24 hours; generally, said reaction is carried out during the time allowing the 9 - fluoro-11β,16α,17,21-tetrahydroxy-pregna-1,4-diene-3,20-dione, in suspension at the beginning of the reaction, to go into solution. When the reaction is over, the acidity of the catalyst is neutralized by treating the reaction mixture with an alkaline aqueous solution, such as an aqueous soluiton of sodium bicarbonate, and the 9 - fluoro - 11β,21-dihydroxy-16α,17-(2-propenylidenedioxy)-pregna - 1,4 - diene-3,20-dione is isolated by usual means such as extraction by solvent, followed by purification and eventually recrystallization.

(2) The eventual esterification is carried out by adding the 9 - fluoro-11β,21-dihydroxy-16α,17-(2-propenylidendioxy)-pregna-1,4-diene-3,20-dione to a solution of the anhydride in pyridine, said anhydride being used in large excess in comparaison with the stoichiometric required quantity; the reaction is carried out at room temperature, for 10 to 40 hours. When the esterification is over, the reaction mixture is added to an aqueous acid solution and the resulting precipitate is isolated by filtration.

(3) The eventual salification by an alkaline agent is realized preferentially by an alkaline or ammonium bicarbonate, carbonate or hydroxide. For example, it is possible to react the stoichiometric required quantity of an alkaline bicarbonate in aqueous solution with a derivative of Formula 1 carrying a free carboxylic (—COOH), dissolved in a hydroorganic solution such as an aqueous solution of acetone. When the reaction is over, the resulting salt is isolated by elimination of the solvent in vacuo.

The derivatives of Formula 1 have very interesting pharmacological properties they have especially a very important thymolytic and glycogenic activity; they are remarkable antiinflammatory agents.

The derivatives of Formula 1 in which R represents a hydrogen atom (derivative designated hereafter as No. 2102–18 and described in Example No. 1), or the —CO—CH₃ radical (derivative designated hereafter as No. 2102–26 and described in Example No. 2, or the —CO—CH₂—CH₂—COOH (derivative designated hereafter as No. 2102-24 and described in Example No. 3), or the —CO—CH$_2$—CH$_2$—COONa (derivative designated hereafter as No. 2102-25 and described in Example No. 4) were more particularly studied. Performed works and obtained results may be summarized as follows:

(1) The thymolytic activity was evaluated on immature rats according to Stephenson's Technique (J. Pharmacol. 1960, 12, 411-415). The derivatives were injected by subcutaneous route, two times daily, one in the morning and the other in the evening, for a period of three days. The animals were sacrificed on the fourth day. The thymi were removed and weighed. The results were expressed as mg. per 100 g. of body weight. The studies were performed on control animals and on animals receiving the doses of compounds as indicated in Table 1, in which the percentage of thymic involution in treated animals was evaluated in comparison with the mean value of the thymus weight in control animals.

TABLE 1

| | Percentage of thymus involution related with administered doses, twice a day, in mg./kg. | | | | |
|---|---|---|---|---|---|
| | 10 | 1 | 0.1 | 0.01 | 0.001 |
| Tested derivatives: | | | | | |
| 2102-18 [a] | 72 | 79 | 73 | 21 | 7 |
| 2102-26 [a] | 75 | 72 | 74 | 60 | |
| 2102-24 [b] | 80 | 88 | 77 | 25 | |
| 2102-25 [c] | 79 | 77 | 73 | 31 | 0 |

[a] Solution or suspension in peanut oil.
[b] Solubilized in water extemporaneously by means of CO$_3$HNa.
[c] Aqueous solution.

(2) The activity of the derivatives on liver glycogen deposition in rats was evaluated according to the technique of Venning et al. (Endocrinology, 1946, 38, 79). Groups of rats adrenalectomized since five days received subcutaneously, respectively a total dose of 2 mcg., 4 mcg. and 8 mcg., for each animal, of derivative dissolved in 1.4 ml. of an aqueous solution containing whether 5% glucose-10% ethanol (2102-18 and 2102-26) or only 5% glucose (2102-25). This volume of 1.4 ml. of solution was given subcutaneously in 7 successive injections, at 45 min. intervals. The solvent was given in the same conditions to a control group of rats. The average of liver glycogen is related in Table 2. The result obtained with control animals was practically 0.

TABLE 2

| | Average of liver glycogen (as g. per 100 g. of organ), related with administered doses, expressed as mcg./rat | | |
|---|---|---|---|
| | 8 | 4 | 2 |
| Tested derivatives: | | | |
| 2102-18 | 3.29 | 1.89 | 0.32 |
| 2102-26 | 2.66 | 1.45 | 0.15 |
| 2102-25 | 1.81 | 0.30 | 0.03 |

(3) The antiinflammatory activity of the derivatives was evaluated on carrageenin abscess, according to a variant of the procedure of Benitz and Hall (Arch. Inter. Pharmacodyn. Therap. 1963, 144, 185-195), with the following experimental conditions: male rats weighing on about 50 g. were divided into groups of 5 animals. On the first day, the animals received, by oral or intraperitoneal route, whether the studied derivatives, or the alone vehicle. One-half of the daily dose was administered in the morning and the remainder in the evening.

On the second day, the same treatment was repeated and, immediately after the first gavage, all the animals received cutaneously in the dorsal lumbar region 0.5 ml. of a 2% carrageenin suspension in saline. On the third day, 24 hours after the carrageenin injection, the animals were sacrificed by chloroform inhalation. The dorsal skin was turned back and the exudate and gelatinous material were collected and weighed together immediately.

The activity of the derivatives was expressed by the inhibition percentage of the abscess. This percentage was calculated by evaluating the difference between the weight of abscesses taken out of the control animals and of the treated animals and referring this difference to the weight of the abscesses of the control animals.

The results appear in Table 3:

TABLE 3

| | | Inhibition percent of carrageenin abscess weight related with administered doses, mg./kg./day | | | | |
|---|---|---|---|---|---|---|
| | Route | 100 | 10 | 1 | 0.1 | 0.01 |
| Derivatives: | | | | | | |
| 2102-18 [a] | P.o. | 63 | 48 | 38 | 26 | 17 |
| 2102-26 [a] | P.o. | 51 | 43 | 33 | | |
| 2102-25 [b] | P.o. | 56 | 35 | 39 | 42 | 0 |
| | I.p. | 51 | 24 | 34 | | |

[a] Solution or suspension in an aqueous solution of gum arabic.
[b] Aqueous solution.

(4) Antiinflammatory activity of the derivatives was also evaluated on carrageenin oedema according to Winter et al. (Proc. Soc. Exp. Biol. Med. 1962, 111, 544-547). The compounds were administered by oral route in aqueous solution (2102-25) or in gum arabic suspension (2102-18) to such a concentration that the ingested volume was 2.5 ml. per kg. of body weight. One hour after the gavage, the thickness of the right hind foot was measured; then 0.05 ml. of a 1% carrageenin solution in saline was injected in the foot-pad. Three hours later, the thickness of the injected foot was again measured with a micrometer. The difference between the 2 measurements expressed the importance of the oedema induced by the carrageenin. The measurements carried out in the same conditions on control animals, receiving the vehicle alone, had allowed to evaluate the inhibition of swelling observed on the treated animals. The results are reported in Table 4:

TABLE 4

| | Inhibition percent of the carrageenin oedema related with doses, mg./kg. | | |
|---|---|---|---|
| | 100 | 10 | 1 |
| Tested derivatives: | | | |
| 2102-18 | 54 | 33 | 21 |
| 2102-25 | 50 | 38 | 21 |

Owing to their remarkable pharmacological properties, the derivatives of Formula 1, according to the invention, are very useful drugs more particularly as antiinflammatory drugs. They may be used in man, for example in actue or chronic rheumatic diseases, inflammatory dermatosis, asthma, viral hepatitis. The usual dose, variable according to the disease, the product used, the treated individal, and the route of administration, may be, for example, from 1 mg. to 100 mg. per day by oral route in man.

In the derivatives of Formula 1, containing a salified carboxylic group —COOA, when A represents an alkaline metal, it may be, for example, sodium or potassium.

As drugs, the derivatives of Formula 1 may be incorporated in pharmaceutical compositions for the digestive, parenteral or local routes; these pharmaceutical compositions may be for example solid or liquid, and be realized in the pharmaceutical forms generally used in human medicine, such as tablets, coated tablets, capsules, granulated substances, solutions, suspensions, syrups, suppositories, varied preparations that can be injected such as solutions, suspensions, sterile powders to dissolve extemporaneously, pomades, creams, jellys, aerosols; they are prepared by the usual methods. The active principle or principles are incorporated therein with various excipients normally employed in these pharmaceutical compositions, for example, talcum, gum arabic, lactose, starch, magnesium stearate, cocoa butter, aqueous or nonaqueous vehicles, animal or vegetal fats, paraffin derivatives, glycols, various wetting dispersing and emulsifying agents and preservatives.

The following nonlimiting examples illustrate the invention:

EXAMPLE 1

9-fluoro-11β,21-dihydroxy-16α,17-(2-propenylidenedioxy)-pregna-1,4-diene-3,20-dione A suspension of 1 g. of 9-fluoro-11β,16α,17,21-tetrahydroxy-pregna-1,4-diene-3,20-dione in a mixture of 35 ml. of dioxan, 15 ml. of acrolein and 0.1 ml. of perchloric acid was stirred for 3 hours at room temperature. The clear solution thus obtained was poured into an aqueous saturated solution of sodium bicarbonate. The mixture was extracted twice with benzene, and the benzenic extract was concentrated to a small volume. The resulting crystals were collected and the 9-fluoro-11β,21-dihydroxy-16α,17-(2-propenylidenedioxy)-pregna-1,4-diene-3,20-dione was obtained as white crystals. Melting point (vacuum sealed capillary tube): 200°–205° C.

$[\alpha]_D^{25}$: +82°5 (c.=1, CHCl$_3$)

Analysis: $C_{24}H_{29}FO_6$. Calculated (percent): C, 66.6; H, 6.8. Found (percent): C, 66.1; H, 6.7.

EXAMPLE 2

21 acetoxy-9-fluoro-11β-hydroxy-16α,17(2-propenylidenedioxy)-pregna-1,4-dione-3,20-dione To a mixture of 1 ml. (0.0106 mole) of acetic anhydried and 8 ml. of dry pyridine was added 1 g. (0.00231 mole) of 9-fluoro-11β,21-dihydroxy-16α,17-(2-propenylidenedioxy)-pregna-1,4-diene-3,20-dione. The resulting solution was left to stand for 20 hours, then was added dropwise to a stirred mixture of 30 g. of ice and 10 ml. of concentrated hydrochloric acid and the resulting mixture was stirred for 1 hour. The obtained precipitate was filtered off and washed with water to neutrality. After vacuum-drying at 100° C. for 2 hours, 950 mg. (87%) of 21-acetoxy-9-fluoro-11β-hydroxy-16α,17-(2-propenylidenedioxy)-pregna-1,4-diene-3,20-dione, were obtained as white crystals, melting point (vacuum sealed capillary tube): 220°–222° C.

$[\alpha]_D^{25}$: +78°4 (c.=1, CHCl$_3$)

Analysis: $C_{26}H_{31}FO_7$. Calculated (percent): C, 65.8; H, 6.6; F, 4.0. Found (percent): C, 66.0; H, 6.7; F, 4.0.

EXAMPLE 3

21 - (3 - carboxypropionyloxy)-9-fluoro-11β-hydroxy-16α, 17 - (2 - propenylidenedioxy) - pregna-1,4-diene,3,20-dione To a solution of 10 g. (0.1 mole) of succinic anhydride in 42 ml. of dry pyridine were added portionwise 10 g. (0.0231 mole) of 9-fluoro-11β,21-dihydroxy-16α,17-(2-propenylidenedioxy)-pregna-1,4-diene-3,20-dione. The resulting solution was left to stand for 20 hours, then was added dropwise to a stirred mixture of 160 g. of ice and 50 ml. of concentrated hydrochloric acid and the resulting mixture was stirred for 1 hour. The obtained precipitate was filtered off and washed with 1 l. of water. The precipitate was suspended in 1 l. of water, stirred for 15 min., then filtered off. After vacuum drying at 45° C. for 24 hours, 10.4 g. (85%) of 21(3-carboxypropionyloxy)-9-fluoro-11β-hydroxy-16α,17-(2-propenylidenedioxy)-pregna-1,4-diene-3,20-dione were obtained as white crystals, melting point (open capillary tube): 148° C.

$[\alpha]_D^{25}$: +69°8 (c.=1, CHCl$_3$)

Analysis: $C_{28}H_{33}FO_9$. Calculated (percent): C, 63.2; H, 6.2. Found (percent): C, 62.8; H, 6.4.

EXAMPLE 4

Sodium salt of 21-(3-carboxypropionyloxy)-9-fluoro-11β-hydroxy - 16α,17 - (2-propenylidenedioxy)-pregna-1,4-diene-3,20-dione To 20 ml. of water were added 10 g. (0.0188 mole) of 21 - (3 - carboxypropionyloxy)-9-fluoro-11β-hydroxy-16α, 17 - (2 - propenylidenedioxy)pregna-1,4-diene-3,20-dione dissolved in 65 ml. of acetone. To the resulting solution was added dropwise a solution of 1.58 g. (0.0188 mole) of sodium bicarbonate in 40 ml. of water. The reaction mixture was stirred for 30 min., filtered, then the filtrate was concentrated in vacuo to dryness. The resulting crystalline product was dried at 45° C. in vacuo for 24 hours, to give 10 g. (96%) of sodium salt of 21-(3-carboxypropionyloxy) - 9 - fluoro-11β-hydroxy-16α,17-(2-propenylidenedioxy)-pregna-1,4-diene-3,20-dione as white, water soluble, crystals. Decomposition without melting above 200° C. (open capillary tube).

$[\alpha]_D^{25}$: +94°6 (c.=1, H$_2$O)

Analysis: $C_{28}H_{32}FNaO_9$. Calculated (percent): C, 60.6; H, 5.8; F, 3.4. Found (percent): C, 60.6; H, 6.1; F, 3.4.

Median lethal dose evaluated by subcutaneous route in rats: 140 mg./kg. (the product had been administered once and the cumulated mortality had been noted 21 days later).

EXAMPLE 5

Tablets were prepared which corresponded to the formula:

| | Mg. |
|---|---|
| 9-fluoro - 11β,21 - dihydroxy-16α,17-(2-propenylidenedioxy) - pregna - 1,4-diene-3,20-dione | 2 |
| Excipient sq. for a tablet | 200 |

NOTE.—Excipient: lactose, starch, talcum, magnesium stearate.

EXAMPLE 6

A pomade was prepared which corresponded to the formula:

| | G. |
|---|---|
| 9-fluoro - 11β,21 - dihydroxy-16α,17-(2-propenylidenedioxy)-pregna-1,4-diene-3,20-dione | 0.1 |
| Excipient sq. for | 100 |

EXAMPLE 7

Parenteral suspensions were prepared which corresponded to the formula:

| | |
|---|---|
| 21-acetoxy - 9 - fluoro-11β - hydroxy-16α,17-(2-propenylidenedioxy) - pregna - 1,4 - diene - 3,20-dione mg | 40 |
| Aqueous excipient sq. for ml | 2 |

EXAMPLE 8

Parenteral preparations were prepared which corresponded to the formula:

| | |
|---|---|
| 21-(3 - carboxypropionyloxy) - 9 - fluoro-11β-hydroxy - 16α,17 - (2 - propenylidenedioxy)-pregna-1,4-diene-3,20-dione mg | 20 |
| Alkaline aqueous excipient sq. for ml | 2 |

EXAMPLE 9

Tablets were prepared which corresponded to the formula:

| | Mg. |
|---|---|
| Sodium salt of 21 - (3 - carboxypropionyloxy)-9-fluoro - 11β - hydroxy - 16α,17 - (2-propenylidenedioxy)-pregna-1,4-diene-3,20-dione | 2 |
| Excipient sq. for a tablet | 200 |

NOTE.—Excipient: lactose, starch, talcum, magnesium stearate.

EXAMPLE 10

Parenteral preparations were prepared which corresponded to the formula:

Sodium salt of 21-(3 - carboxypropionyloxy)-9-fluoro-11β - hydroxy - 16α,17 - (2-propenylidenedioxy)-pregna-1,4-diene-3,20-dione _____ mg__ 20
Aqueous excipient sq. for _____ ml__ 2

EXAMPLE 11

A pomade was prepared which corresponded to the formula:

G.

Sodium salt of 21 - (3 - carboxypropionyloxy)-9-fluoro - 11β - hydroxy-6α,17-(2-propenylidenedioxy) - pregna - 1,4 - diene-3,20-dione _____ 0.1
Excipient sq. for _____ 100

EXAMPLE 12

Eye-drops were prepared which corresponded to the formula:

Sodium salt of 21(3-carboxypropionyloxy)-9-fluoro-11β - hydroxy - 16α,17 - (2-propenylidenedioxy)-pregna-1,4-diene-3,20-dione _____ mg__ 10
Solution isotonic with tears _____ ml__ 10

We claim:
1. A pregnan derivative having the formula:

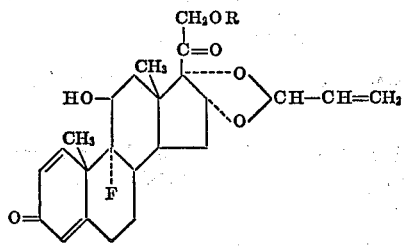

in which R is a member selected from the group consisting of:
(a) a hydrogen atom,
(b) an acyl radical of a saturated aliphatic carboxylic acid containing from 2 to 6 carbon atoms, and
(c) an acyl radical of a substituted staturated aliphatic carboxylic acid containing from 2 to 6 carbon atoms in which the substitution in said carboxylic acid is a —COOA group in which A is a member of the group consisting of:
  (i) a hydrogen,
  (ii) an alkali metal, and
  (iii) an ammonium
said —COOA group being separated from the —CO- group of the acyl radical by at least 2 carbon atoms.

2. A pregnan derivative according to claim 1, wherein R represents a hydrogen atom.

3. A pregnan derivative according to claim 1, wherein R represents the radical —CO—CH$_3$.

4. A pregnan derivative according to claim 1, wherein R is a member selected from the group consisting of
(a) —CO—CH$_2$—CH$_2$—COOH and
(b) —CO—CH$_2$—CH$_2$—CCONa
radicals.

References Cited
UNITED STATES PATENTS

| | | | |
|---|---|---|---|
| 3,048,581 | 8/1962 | Fried | 260—239.55 |
| 3,053,836 | 9/1962 | Fried | 260—239.55 |
| 3,126,375 | 3/1964 | Ringold et al. | 260—239.55 |
| 3,180,797 | 4/1965 | Cacchillo et al. | 167—77 |

HENRY A. FRENCH, Primary Examiner

U.S. Cl. X.R.
424—241

UNITED STATES PATENT OFFICE
CERTIFICATE OF CORRECTION

Patent No. 3,798,216      Dated March 19, 1974

Inventor(s) JACQUES ROBERT BOISSIER, ET. AL.

It is certified that error appears in the above-identified patent and that said Letters Patent are hereby corrected as shown below:

Column 1, lines 2-4 should read as follows: -- 9-Fluoro-11β, 21-dihydroxy-16α,17-(2-propenylidenedioxy)-pregna-1,4-diene-3,20-dione and derivatives thereof -- . Column 1, lines 6, 7 and 8, "Societe Industrielle pour la Fabrication des Antibiotique (S.I.F.A.), Puteaux, France" should read -- Roussel-Uclaf, Paris, France, a company of France -- .

Signed and sealed this 13th day of August 1974.

(SEAL)
Attest:

McCOY M. GIBSON, JR.      C. MARSHALL DANN
Attesting Officer      Commissioner of Patents

PO-1050
(5/69)

UNITED STATES PATENT OFFICE
CERTIFICATE OF CORRECTION

Patent No. __3,798,216__         Dated __March 19, 1974__

Inventor(s) __Jacques R. Boissier et al__

It is certified that error appears in the above-identified patent and that said Letters Patent are hereby corrected as shown below:

Col. 3, line 36 and 37 - change "2 meg., 4 meg. and 8 meg.,"

to --2 mcg, 4 mcg and 8 mcg,--

Col. 3, line 70 - change "cutaneously" to --subcutaneously--

Col. 5, line 6 and 7 (first and second line of Example 1)

change "9-fluoro-11β,21-dihydroxy-16α,17-(2-propyleniden
idenedioxy)-pregna-1,4-diene-3,20-dione"

to --9-fluoro-11β,21-dihydroxy-16α,17-(2-propenyl-
idenedioxy)-pregna-1,4-diene-3,20-dione--

Col. 5, line 32 - change "dried" to --drid--

Signed and sealed this 17th day of December 1974.

(SEAL)
Attest:

McCOY M. GIBSON JR.            C. MARSHALL DANN
Attesting Officer              Commissioner of Patents

UNITED STATES PATENT OFFICE
CERTIFICATE OF CORRECTION

Patent No. 3,798,216          Dated 19 March 1974

Inventor(s) Jacques R. Boissier and Roger Ratouis

It is certified that error appears in the above-identified patent and that said Letters Patent are hereby corrected as shown below:

Col. 1, line 10, insert

-- , which claims the priority of French Applications Numbers 69 06348 filed March 7, 1969 and 69 38912 filed November 13, 1969 -- between "1970" and the period (.);

and

Col. 1, line 51, insert

-- , which claims the priority of French Applications Numbers 69 06348 filed March 7, 1969 and 69 38912 filed November 13, 1969 -- between "now abandoned" and the period (.) .

Signed and Sealed this third Day of February 1976

[SEAL]

Attest:

RUTH C. MASON
*Attesting Officer*

C. MARSHALL DANN
*Commissioner of Patents and Trademarks*